(No Model.)

P. C. WIEST.
CARAMEL HOLDER.

No. 428,765. Patented May 27, 1890.

Witnesses:
E. P. Ellis,
J. M. Nesbit.

Inventor:
P. C. Wiest,
per Lehmann & Pattison
Att'ys

THE NORRIS PETERS CO., PHOTO-LITHO., WASHINGTON, D. C.

UNITED STATES PATENT OFFICE.

PETER C. WIEST, OF YORK, PENNSYLVANIA.

CARAMEL-HOLDER.

SPECIFICATION forming part of Letters Patent No. 428,765, dated May 27, 1890.

Application filed March 21, 1890. Serial No. 344,826. (No model.)

*To all whom it may concern:*

Be it known that I, PETER C. WIEST, of York, in the county of York and State of Pennsylvania, have invented certain new and useful Improvements in Caramel Packers or Holders; and I do hereby declare the following to be a full, clear, and exact description of the invention, such as will enable others skilled in the art to which it pertains to make and use it, reference being had to the accompanying drawings, which form part of this specification.

My invention relates to an improvement in caramel packers or holders; and it consists in the construction hereinafter described and claimed.

The objects of my invention are to provide a holder for caramels which is so constructed that the caramels placed thereon are always held entirely separate from each other, and will not adhere to the tin or plate on which they are placed, and thus enable them to be readily thrown or emptied off at any time, and by means of which any suitable number of layers of unwrapped caramels can be packed in the same box or case without any layer interfering with the other.

Figure 1:
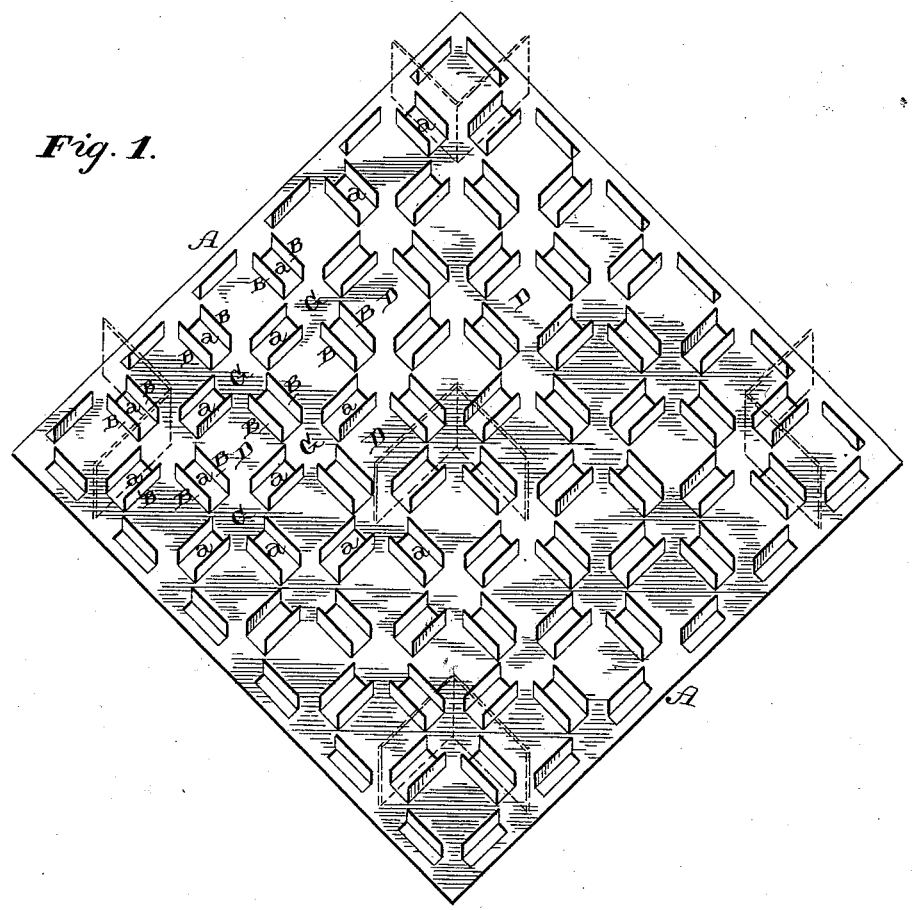
Figure 2:
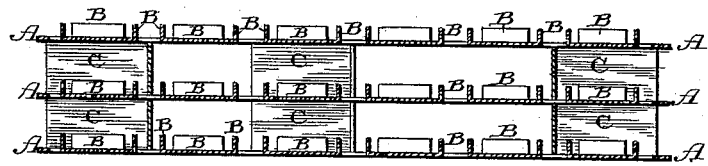
Figure 3:
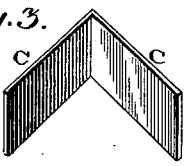

Figure 1 is a perspective of a caramel-holder which embodies my invention. Fig. 2 is a vertical section showing several layers placed one upon the top of the other. Fig. 3 is a perspective of one of the L-shaped plates.

A represents the plate or sheet of any suitable material that may be preferred, and through which are made a number of cuts or openings *a*, which correspond to a double T, and which openings are cut upon regular lines at right angles to each other, and between every four openings there is just sufficient space in which to place a caramel. After the cuts have been made through the sheet the double flies or flanges B, having smooth edges, are turned up by suitable tools prepared for the purpose, and every fly or flange has sufficiently smooth edges so that the caramels will not stick or adhere to them. If the edges of the flies or flanges are not cut sufficiently smooth, the caramel adheres to them, and then the caramels must be forced or broken off. The four flies or flanges between which a caramel is placed being perfectly smooth, the caramel does not adhere to them when packed for transportation or storage, and hence at any time they can be emptied off from the plate without leaving marks upon the caramel.

By means of this invention unwrapped caramels can be packed or shipped with the same freedom as those which have been wrapped in paraffine-paper. It will be noticed that the openings from which the flanges or flies are turned up are of sufficient size to separate the caramels far enough to prevent their coming in contact and to allow the L-shaped devices C to be placed between the caramels for the purpose of separating one holder from another when they are to be packed in boxes or cases. These devices C are preferably made of sheet metal, and have sufficient height to hold the plates separated and just far enough from each other to prevent the plate upon top from adhering to the caramels below. Five of these L-shaped devices are preferably used between every two layers, and they separate the holders in such a manner that any desired number of layers of unwrapped caramels can be packed in the same box or case with perfect safety.

As here shown, the flanges of one row in any two adjacent rows are parallel with the direction of said rows, while the flanges of the other row are at right angles to this direction, whereby the large square spaces D for the reception of the caramels are formed at the sides of the flanges, and the spaces G are formed at the ends of the flanges, so that the corners of the caramels are separated, and also a space formed for the corners of the L-shaped pieces or supports C, which have their straight portions placed between the said flanges and parallel therewith.

By means of the construction here shown each caramel touches only four flat sides, and hence has no opportunity to come in contact with or adhere to an edge, thus making it possible to pack any desired quantity of unwrapped caramels in the same package.

Having thus described my invention, I claim—

1. A caramel packer or holder consisting of a sheet having rows of flanges, the flanges of one row in any two adjacent rows being parallel with the direction of said rows and the flanges of the other row being at right angles to this direction, whereby spaces are formed at the sides of the flanges for the caramels, substantially as shown.

2. The combination, with a caramel packer or holder consisting of a sheet having rows of flanges, the flanges of one row in any two adjacent rows being parallel with the direction of said rows and the flanges of the other row being at right angles to this direction, whereby spaces are formed at the sides and ends of the flanges, of an L-shaped support adapted to be placed in the spaces at the ends of the flanges and between the flanges of each pair for supporting another holder above the caramels in the holder below, substantially as shown and described.

In testimony whereof I affix my signature in presence of two witnesses.

P. C. WIEST.

Witnesses:
E. P. ELLIS,
F. A. LEHMANN.